W. FRITZ.
STUFFING BOX FOR ROTARY PARTS.
APPLICATION FILED SEPT. 7, 1909.

1,005,954.

Patented Oct. 17, 1911.

Witnesses
Fred A. Klein.
John A. Kellenbeck

Inventor
Walter Fritz
By
Briesen & Knauth
Attorneys

UNITED STATES PATENT OFFICE.

WALTER FRITZ, OF BERLIN, GERMANY.

STUFFING-BOX FOR ROTARY PARTS.

1,005,954.      Specification of Letters Patent.      Patented Oct. 17, 1911.

Application filed September 7, 1909. Serial No. 516,573.

*To all whom it may concern:*

Be it known that I, WALTER FRITZ, a subject of the German Emperor, and resident of Berlin, Germany, have invented certain new and useful Improvements in Stuffing-Boxes for Rotary Parts, of which the following is a specification.

My invention relates to means for packing shafts and other rotary parts of machinery and has for its object to provide a tight joint without any undue friction and heating of the parts thereby avoiding the dangers due to heated bearings and shafts.

It is well known that the expansion due to the heating of rotary parts tends to force them more tightly against the packing surfaces, thereby increasing the friction and causing a further rise of temperature which is liable to reach a dangerous point. This is especially the case with machinery rotating at high speed. According to my present invention, the packing is arranged within the surface on which it rubs during the rotation of the part of machinery and the member which surrounds the packing is free to expand outwardly.

My invention may be applied either with the packing stationary or connected with the rotary member so as to share its rotation.
In each case the surrounding sleeve or stuffing box will expand outwardly thereby reducing the pressure between the stuffing box and the packing and causing a decrease of temperature owing to the reduced friction.
The stuffing box will thus automatically adjust itself to the proper diameter at which the temperature of the rotary member remains practically constant. There is, therefore, no danger of the shaft or bearing becoming overheated or of the shaft becoming jammed tight in its bearings.

Figure 1:
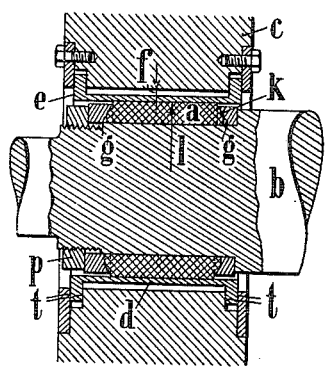
Figure 2:
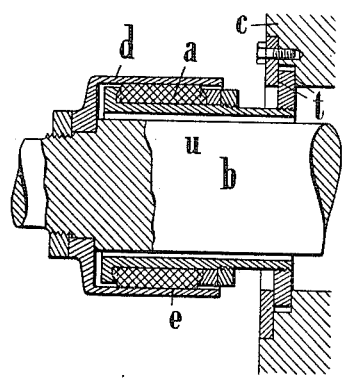
Figure 3:
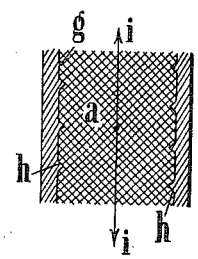
Figure 4:
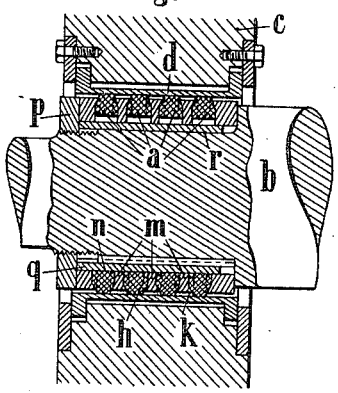
Figure 5:
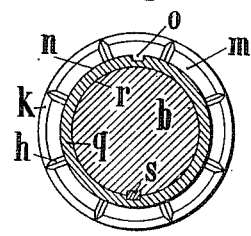

In the accompanying drawings I have illustrated several different forms of my invention, Figures 1, 2 and 4 being longitudinal sections, Fig. 3 a partial peripheral section, and Fig. 5 a cross section of the construction shown in Fig. 4.

In Fig. 1 the packing *a* which may be made of any approved material is secured to the shaft *b* so as to rotate in unison therewith. To the stationary member *c* through which it is intended to have the shaft *b* pass tightly, I have secured a sleeve or stuffing box *e* in such a manner that it will engage the packing *a* but will not turn therewith. This sleeve, at the region engaged by the packing, has sufficient play in an outward direction as indicated at *f* to allow for its expansion under the influence of increasing temperature. The stationary member *c*, therefore, does not interfere in the least with the radial outward expansion of the sleeve *e*.

In Fig. 2 the packing *a* is secured to the stationary member *c* and the sleeve *d* is secured to the shaft *b* so as to rotate therewith. In each of these constructions the inner surface *e* of the sleeve is in frictional engagement with the outer surface of the packing *a*. In this second structure, also, the sleeve *d* is free to expand outwardly when its diameter increases owing to heating.

In both of these constructions the packing *a* is arranged in an annular space. In view of the fact that friction between the sleeve and the packing tends to turn or twist the latter relatively to the shaft in Fig. 1 or to the stationary member in Fig. 2, it is advisable to provide means for holding the packing against circumferential movement relatively to the part carrying it. This may be accomplished in the manner illustrated by Fig. 3 where the side surfaces *g* of the ring between which the packing is held are provided with projections *l* fitting corresponding recesses of the packing and preventing its relative movement in the direction of rotation indicated by the arrow *i*.

When the packing rotates with the shaft as in Fig. 1, it is subject to the influence of centrifugal force which would tend to increase the friction by throwing the packing outward. This may be prevented by suitable projections, such as the annular ridges *k* provided in Fig. 1 on the opposing faces *g* of the rings which hold the packing. I thus prevent movement of the packing in the radial direction indicated by the arrow *l*.

In many cases packing consists of a plurality of sections stacked or arranged lengthwise of the shaft. With such constructions, each of the packing rings or packing members should be held individually against movement both radial and circumferential by means of the character above set forth. When the packing rings are simply stacked in engagement with one another, it is very difficult to obtain this result, for the reason that the rings nearest the center are held either by the cylindrical surface of the stuffing box or through the medium of the rings located at the ends. In order to obtain a better construction, I prefer in such cases to interpose closed spacing rings between the packing rings, such spacing rings being capable of sliding lengthwise or axially as by means of a feather and groove, while being connected with the packing rings by means of projections and notches to prevent any radial or circumferential movement of the packing rings relatively to the spacing rings. An example of such a construction is illustrated by Figs. 4 and 5. Here I have shown four packing rings $a$ in conjunction with three interposed spacing rings $m$ which are provided with ridges $k$ to prevent a radial movement of the packing rings and also with projections $h$ to prevent a circumferential movement of said rings. Each of the rings $m$ is provided with a feather $o$ fitted into a suitable groove provided in the outer surface of a sleeve $q$ held to rotate with the shaft $b$ as by means of a key $s$.

It is desirable to provide for tightening the packing, especially when it is of an elastic or soft character. Thus in Fig. 1 a nut $p$ is provided for this purpose. When several packing rings are employed as in Fig. 4, it is difficult to tighten them uniformly by merely exerting pressure on the end ring, since friction would cause most of the pressure to come on the end ring and those adjacent to it. Fig. 4 shows an arrangement in which the rings $m$ are mounted to move in unison with the sleeve $q$ when the nut $p$ is tightened so that a uniform pressure will be exerted on each of the packing rings $a$. It will be understood that the sleeve $q$ is mounted to slide lengthwise on the outer surface $r$ of the shaft.

In some constructions provision has to be made for a lateral movement of the shaft. In such cases the stuffing box must comprise a laterally yielding member capable of following the shaft in its lateral movement. This may be obtained by arranging the non-rotary part of the stuffing box so that it can slide or move in a direction perpendicular to the axis of the shaft as shown in Fig. 1. Here the sleeve $d$ which does not rotate is capable of sliding radially on the surfaces $t$ of the stationary member $c$ and can thus follow the motion of the shaft should it be flexed. When the packing is non-rotary as in Fig. 2, the packing itself with its carrier $u$ is movable radially on the guiding surfaces $t$ on the stationary member $c$. In each case, of course, suitable constructions must be provided to prevent the transversely sliding member from being carried along by the rotation of the shaft or other rotary member.

I claim as my invention:

1. The combination, with a stationary member and a rotary member, one surrounding the other, of a packing carried by one of said members, and a friction sleeve carried by the other member and engaging the outer surface of the packing, said sleeve being free to expand outwardly.

2. The combination, with a stationary member and a rotary member, of a packing carried by one of said members and engaging the other member, and a sleeve surrounding the packing and free to expand outwardly.

3. The combination, with a stationary member, and a rotary member, of a packing carried by one of said members and engaging the other member, and a sleeve surrounding the packing and free to expand outwardly, and means for preventing circumferential displacement of the packing relatively to the member carrying it.

4. The combination with a stationary member and a rotary member, of a packing carried by one of said members and engaging the other member, and a sleeve surrounding the packing and free to expand outwardly, and means for preventing radial displacement of the packing relatively to the member carrying it.

5. The combination, with a stationary member and a rotary member, of a packing carried by one of said members and engaging the other member, and a sleeve surrounding the packing and free to expand outwardly, and means for preventing circumferential and radial displacement of the packing relatively to the member carrying it.

6. The combination, with a stationary member and a rotary member, of a plurality of packing rings carried by one of said members and engaging the other member, a sleeve surrounding the packing and free to expand outwardly, and axially movable spacing rings interposed between adjacent packing rings.

7. The combination, with a stationary member and a rotary member, of a sleeve carried by one of said members, a plurality of packing rings carried by the other of said members and engaging the inner surface of the sleeve, said sleeve surrounding the packing and free to expand outwardly, and axially movable spacing rings interposed between adjacent packing rings and provided with means for holding the packing rings.

8. The combination, with a stationary member and a rotary member, of a sleeve carried by one of said members, a packing carried by the other of said members and engaging the inner surface of the sleeve, said sleeve surrounding the packing and free to expand outwardly, and means for compressing the packing to tighten the joint.

9. The combination, with a stationary member, and a rotary member, of a sleeve carried by one of said members, a packing carried by the other of said members and engaging the inner surface of the sleeve, said sleeve surrounding the packing and free to expand outwardly, and a compressing sleeve mounted to slide axially and provided with means for compressing the packing.

10. The combination with a stationary member and a rotary member, of a sleeve carried by one of said members, a packing carried by the other of said members and engaging the inner surface of the sleeve, said sleeve surrounding the packing and free to expand outwardly, the non-rotary section of the joint thus formed being movable transversely of the axis of rotation to allow for a flexing of the rotary member.

In testimony whereof I have hereunto set my hand in the presence of two subscribing witnesses.

WALTER FRITZ.

Witnesses:
  WOLDEMAR HAUPT,
  HENRY HASPER.